May 3, 1932.  E. W. ISOM  1,856,640
ART OF CRACKING HYDROCARBONS
Filed April 12, 1929
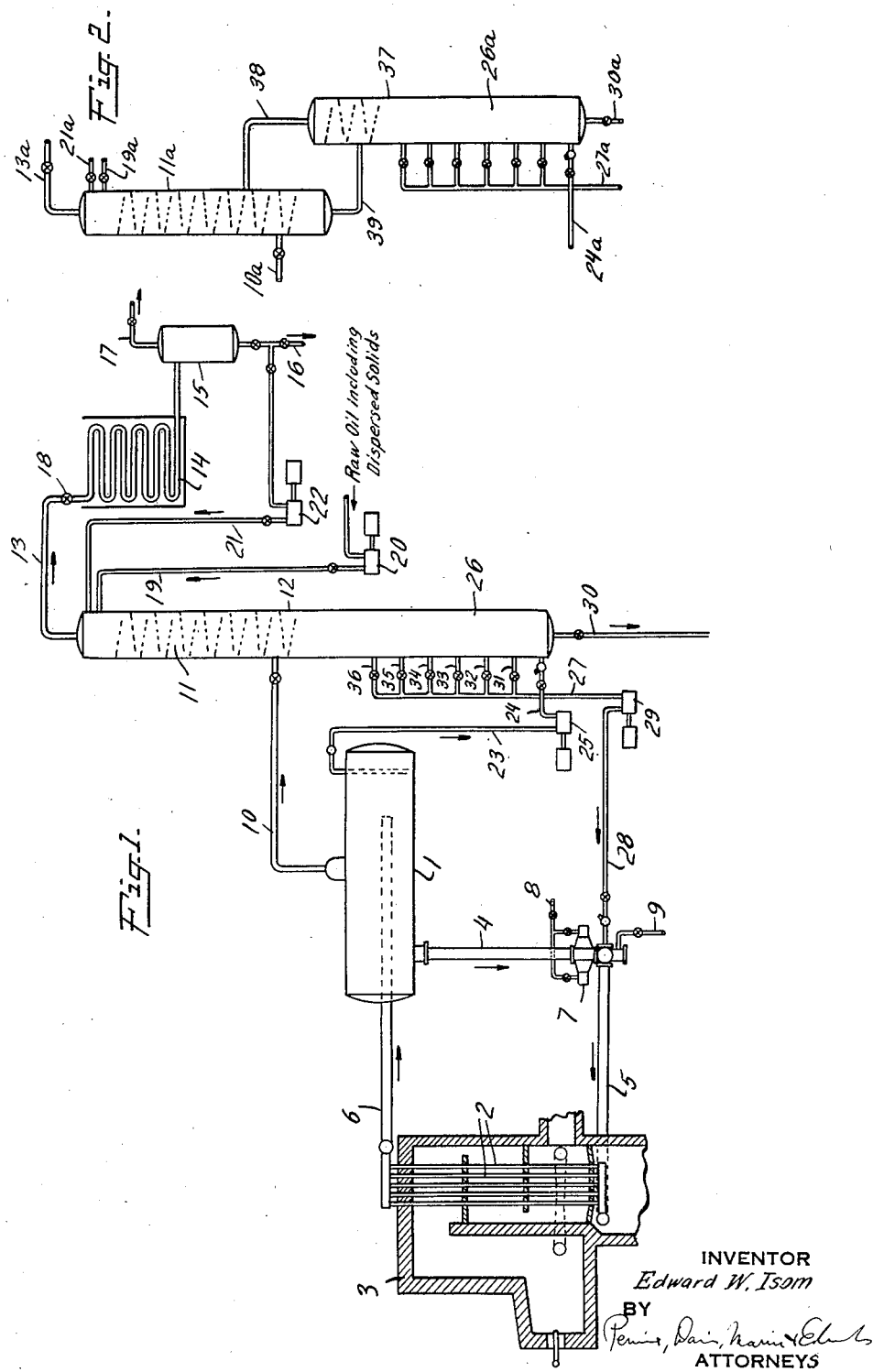
INVENTOR
*Edward W. Isom*
BY
ATTORNEYS Patented May 3, 1932

1,856,640

UNITED STATES PATENT OFFICE

EDWARD W. ISOM, OF SCARSDALE, NEW YORK, ASSIGNOR TO SINCLAIR REFINING COMPANY, OF NEW YORK, N. Y., A CORPORATION OF MAINE

ART OF CRACKING HYDROCARBONS

Application filed April 12, 1929. Serial No. 354,449.

This invention relates to improvements in the manufacture of lower boiling hydrocarbon oils, such as gasoline, from higher boiling hydrocarbon oils, such as gas oil and fuel oil, by pressure distillation cracking operations.

In pressure distillation cracking operations it is frequently advantageous to disperse some solid material in the raw stock supplied to the operation, as described in an application filed February 12, 1927, Serial No. 167,716 by Eugene C. Herthel, for example. Absorbent agents or desulphurizing agents, for example, may be so dispersed in the raw stock supplied to the operation. The presence of such dispersed solids in the oil circulating over heating surfaces through which heat is transferred to the oil, however, tends to involve difficulty because of deposition of solid or semi-solid material on such heating surfaces. In some cases the raw stock supplied to the operation itself contains dispersed solids, the presence of such dispersed solids involving similar difficulty.

The present invention provides an improved method of operation including the concentration of solid or semi-solid materials present in the charge of oil undergoing pressure distillation in an externally unheated settling zone within the system. The invention is of special value and application in connection with operations in which the raw stock supplied to the operation includes dispersed solids, an absorbent agent or a desulphurizing agent, for example. The invention provides for the subjection of the entire charge of oil undergoing pressure distillation to the action of such absorbent agents or desulphurizing agents supplied to the operation dispersed in raw stock while maintaining a minimum concentration of such dispersed solids in that part of the oil charge circulating over heating surfaces through which heat is transferred to the oil.

In carrying out the present invention, a charge of high boiling oil is heated to a cracking temperature by circulation over externally fired heating surfaces and vapors are taken off from the circulating oil charge under superatmospheric pressure, these vapors are subjected to a refluxing operation into which raw oil is directly introduced, the high boiling oil forming the oil charge is circulated through an externally unheated settling zone in which solid or semi-solid materials are concentrated, admixed reflux condensate and unvaporized raw oil from the refluxing operation are supplied to this settling zone, and the residue concentrated in the settling zone is periodically discharged therefrom.

The invention will be further described in connection with the accompanying drawings which illustrate diagrammatically and conventionally, in elevation and partly in section and with parts broken away, apparatus for carrying out the invention. Fig. 1 illustrates one form of apparatus adapted for carrying out the invention. Fig. 2 illustrates a modified arrangement of part of the apparatus illustrated in Fig. 1.

The pressure still illustrated is of the general type described in Letters Patent No. 1,285,200, issued to the Sinclair Refining Company, November 19, 1918, on my application. This pressure still comprises a bulk supply drum 1, a battery of heating tubes 2 arranged in the heating flue of a heating furnace 3, and circulating connections 4, 5 and 6 including a circulating pump 7 for circulating oil from the bulk supply drum through the heating tubes and back to the bulk supply drum. Connection 8 is provided for supplying cooling oil to and through the bearings of the circulating pump 7, as described in Letters Patent No. 1,676,202, issued to the Sinclair Refining Company, July 3, 1928, on the application of myself and the late John E. Bell. Connection 9 is provided for initially charging the still at the beginning of a run and for pumping out the still at the end of a run.

Vapors escape from the bulk supply drum 1 through connection 10 to a reflux tower 11 arranged in the upper part of the drum 12. Vapors escape from this reflux tower through connection 13 to the condenser 14. The condenser 14 is arranged to discharge into the receiver 15 from which the condensate distillate product is discharged through connection 16, uncondensed vapors and gases being discharged through connection 17. Pressure in the system is maintained and regulated by means of valve 18 or by means of suitable valves arranged beyond the condenser or receiver. Raw oil is supplied to the reflux tower 11 through connection 19 by means of pump 20. The refluxing operation may be controlled by regulating the rate at which raw oil is so supplied, or such control may be supplemented by the regulated reintroduction into the reflux tower 11 through connection 21 by means of pump 22 of part of the condensed distillate product, or a similar fraction.

The oil forming the still charge is circulated from the bulk supply drum 1 through connections 23 and 24 by means of pump 25 to a settling zone 26 provided in the lower end of drum 12 and thence, together with reflux condensate and unvaporized raw oil supplied to the settling zone from the reflux tower, back to the bulk supply drum 1 through connections 27 and 28 and the heating tubes 2 by means of pump 29. In operation, a charge of concentrated residue is progressively accumulated in the lower end of the drum 12, the oil forming the circulating charge being withdrawn at progressively higher levels through valved branch connections 31, 32, 33, 34, 35 and 36 as the charge of concentrated residue accumulates, and when a sufficient charge has accumulated the concentrated residue is discharged through connection 30 and the operation continued, the oil forming the circulating charge then being withdrawn through connection 31 and then at progressively higher levels as just described.

Instead of being arranged within a single drum, as in the apparatus illustrated in Fig. 1, the reflux tower and the settling zone may be separated, as in the apparatus illustrated in Fig. 2. In this modified apparatus, vapors escape from the bulk supply drum 10a to a reflux tower 11a through connection 10a to a reflux tower 11a. Vapors escape from this reflux tower through connection 13a to the condenser. Raw oil is supplied to the reflux tower 11a through connection 19a. The refluxing operation may be controlled by regulating the rate at which raw oil is so supplied, or such control may be supplemented by the regulated reintroduction into the reflux tower 11a through connection 21a of part of the condensed distillate product, or a similar fraction. The oil forming the still charge is circulated from the bulk supply drum through connection 24a to a settling zone 26a provided in the lower end of drum 37 and thence, with reflux condensate and unvaporized raw oil supplied to the settling zone from the reflux tower, back to the bulk supply drum through connection 27a. Vapors escape from the upper end of drum 37 through connection 38 to the reflux tower 11a and reflux condensate and unvaporized raw oil are supplied to the upper end of the drum 37 from the reflux tower 11a through connection 39. The concentrated residue is discharged from the drum 37 through connection 30a.

In carrying out the invention in the apparatus illustrated in Fig. 1, for example, the pressure distillation cracking operation may be carried out under a pressure in the neighborhood of 100–300 pounds per square inch, this pressure being maintained and regulated by means of valve 18 and the oil charge being heated in the heating tubes 2 to a corresponding temperature or a somewhat higher temperature. Raw oil including dispersed solids, a pound of 60–80 mesh fuller's earth or ½ pound of hydrated lime per barrel, for example, is supplied through connection 19. Lower boiling components of this raw oil may be vaporized in the reflux tower 11. The unvaporized raw oil together with dispersed solids flows downwardly through the reflux tower into the settling zone 26 provided in the lower end of the drum 12. The reflux condensate from the reflux tower also flows downwardly into this settling zone. In the settling zone 26 the reflux condensate and unvaporized raw oil mingle with oil forming the still charge circulating from the bulk supply drum 1 to the settling zone through connection 24 and from the settling zone back to the bulk supply drum 1 through connection 27. In the comparative quiescence of the settling zone 26 heavy solids and semi-solids accumulate as a concentrated residue. This concentration is promoted by the addition of the comparatively low boiling reflux condensate to that part of the still charge within the settling zone. The oil components of the still charge-reflux condensate-unvaporized raw oil mixture are maintained in circulation through the still system by means of the pump 29, in conjunction with the pump 25. The raw oil itself, the reflux condensate and the circulating still charge are thus all subjected, in the drum 12, to the action of the absorbent agent or desulphurizing agent supplied to the operation dispersed in raw stock while, because of the concentration effected in the lower end of the drum 12, a minimum concentration of such agents is maintained in the oil charge circulating through the heating tubes 2. Initially, a low level is maintained in the settling zone 26 in the lower end of drum 12, and as concentrated residue accumulates in the settling zone this level is progressively raised until it approaches the lower end of the reflux tower section of the drum 12. The accumulated concentrated residue is then discharged, as a batch, through connection 30. This operation is repeated until the still is shut down for cleaning. The concentrated residue may be discharged from the settling zone in batches of as much as 2000–3000 gallons or more.

In carrying out the present invention, raw stock including dispersed solids may be supplied directly to the settling zone instead of being introduced directly into the vapors in the refluxing operation, although it is usually more advantageous, particularly where the raw stock includes a dispersed absorbent agent or desulphurizing agent, to introduce the raw stock directly into the vapors in the refluxing operation.

In the apparatus illustrated, the bulk supply drum 1, the circulating connections 4, 5 and 6, the connections 10, 23, 24, 27 and 28, and the drum 12 in Fig. 1 or the drum 37 and the tower 11a and connections 38 and 39 in Fig. 2 are with advantage thoroughly lagged or thermally insulated.

I claim:

1. In cracking higher boiling hydrocarbon oils to produce lower boiling hydrocarbon oils therefrom, the improvement which comprises heating a charge of high boiling oil to a cracking temperature by cyclic circulation over externally fired heating surfaces while taking off vapors therefrom under superatmospheric pressure, subjecting such vapors to a refluxing operation and introducing raw oil directly into the vapors in the refluxing operation, withdrawing high boiling oil from the cyclically circulating charge and passing the oil so withdrawn through an externally unheated settling zone and thence back to the said cyclically circulating charge and supplying admixed reflux condensate and unvaporized raw oil from the refluxing operation to this settling zone, and periodically discharging residue concentrated in the settling zone therefrom.

2. In cracking higher boiling hydrocarbon oils to produce lower boiling hydrocarbon oils therefrom, the improvement which comprises heating the charge of high boiling oil to a cracking temperature by cyclic circulation over externally fired heating surfaces while taking off vapors therefrom under superatmospheric pressure, subjecting such vapors to a refluxing operation and introducing raw oil including dispersed solids directly into the vapors in the refluxing operation, withdrawing high boiling oil from the charge and passing the oil so withdrawn through an externally unheated settling zone and thence back to the said cyclically circulating charge and supplying admixed reflux condensate and unvaporized raw oil from the refluxing operation to this settling zone, and periodically discharging residue concentrated in the settling zone therefrom.

3. In cracking higher boiling hydrocarbon oils to produce lower boiling hydrocarbon oils therefrom, the improvement which comprises heating a charge of high boiling oil to a cracking temperature by cyclic circulation over externally fired heating surfaces while taking off vapors therefrom under superatmospheric pressure, withdrawing high boiling oil from the cyclically circulating charge and passing the oil so withdrawn through an externally unheated settling zone and thence back to the said cyclically circulating charge, subjecting the vapors taken off from the circulating charge to a refluxing operation and supplying reflux condensate therefrom to the settling zone, supplying raw oil including dispersed solids to the settling zone, and periodically discharging residue concentrated in the settling zone therefrom.

In testimony whereof I affix my signature.

EDWARD W. ISOM.